US012702878B2

(12) United States Patent
Orms

(10) Patent No.: US 12,702,878 B2
(45) Date of Patent: Aug. 11, 2026

(54) ENERGY ABSORBING LANYARD

(71) Applicant: Robert Kent Orms, Bozeman, MT (US)

(72) Inventor: Robert Kent Orms, Bozeman, MT (US)

( * ) Notice: Subject to any disclaimer, the term of this patent is extended or adjusted under 35 U.S.C. 154(b) by 0 days.

(21) Appl. No.: 18/383,995

(22) Filed: Oct. 26, 2023

(65) Prior Publication Data

US 2025/0135247 A1 May 1, 2025

(51) Int. Cl.
*A62B 35/04* (2006.01)
*A62B 35/00* (2006.01)

(52) U.S. Cl.
CPC .......... *A62B 35/04* (2013.01); *A62B 35/0075* (2013.01)

(58) Field of Classification Search
CPC ............................ A62B 35/04; A62B 35/0075
See application file for complete search history.

(56) References Cited

U.S. PATENT DOCUMENTS 3,444,957 A * 5/1969 Gilpin, Jr. .............. A62B 35/04 182/3
4,100,996 A * 7/1978 Sharp ..................... A62B 35/04 188/65.4
4,253,544 A * 3/1981 Dalmaso ................ A62B 35/04 182/18
4,446,944 A * 5/1984 Forrest ................... A62B 35/04 182/3
4,538,702 A * 9/1985 Wolner ................... F16F 7/006 182/230
5,113,981 A * 5/1992 Lantz ...................... F16F 7/006 267/74
5,174,410 A * 12/1992 Casebolt ................. F16F 7/006 188/371
5,205,803 A * 4/1993 Zemitis .................... D07B 1/18 482/121
5,607,736 A * 3/1997 Williams ................. D04C 1/12 428/36.9
6,085,802 A * 7/2000 Silberberg ........... D03D 1/0005 139/387 R
6,299,040 B1 * 10/2001 Matias ............... A62B 35/0075 224/254
6,533,066 B1 * 3/2003 O'Dell ................. D03D 1/0005 182/4
6,691,824 B2 * 2/2004 Sharp ..................... A62B 35/04 182/18
6,776,317 B1 * 8/2004 Parker ...................... B25H 3/00 224/904
6,959,784 B2 * 11/2005 Diggle ................... A63B 27/00 280/805
7,032,529 B2 * 4/2006 Sanford .................. F16F 7/006 482/121

(Continued)

FOREIGN PATENT DOCUMENTS

CA 2109285 * 5/1994

*Primary Examiner* — Eret C McNichols
(74) *Attorney, Agent, or Firm* — AVEK IP, LLC; Jessica Lambert

(57) ABSTRACT

An energy absorbing lanyard having a first end couplable to a harness connector, a second end couplable to an anchorage end connector, and an energy absorbing section positioned between the first end and the second end. The energy absorbing section includes a first tubular webbing encasing a second tubular webbing and an elastic webbing.

16 Claims, 2 Drawing Sheets

(56) References Cited

U.S. PATENT DOCUMENTS

| | | | | |
|---|---|---|---|---|
| 7,665,575 | B2 * | 2/2010 | Tanaka | D03D 11/00 182/3 |
| 7,794,374 | B1 * | 9/2010 | Park | A63B 21/0552 482/122 |
| 8,316,988 | B2 * | 11/2012 | Russell | D03D 11/00 182/3 |
| 8,675,823 | B2 * | 3/2014 | Hooten | A62B 35/04 379/37 |
| 8,905,451 | B1 * | 12/2014 | Golz | A62B 3/00 5/624 |
| 8,997,317 | B2 * | 4/2015 | Rinklake | A62B 35/04 24/301 |
| 9,585,770 | B2 * | 3/2017 | Simmons, III | A43B 7/20 |
| 9,630,081 | B2 * | 4/2017 | Gillespie | A63B 71/0054 |
| 10,343,001 | B2 * | 7/2019 | Seman | A62B 35/0075 |
| 10,625,708 | B2 * | 4/2020 | Jessup | B60R 22/16 |
| 10,716,390 | B2 * | 7/2020 | Wagner | A45F 5/00 |
| 10,828,517 | B2 * | 11/2020 | Bhaskarwar | A62B 35/0025 |
| 10,844,922 | B2 * | 11/2020 | Comet | F16F 7/006 |
| 11,198,027 | B2 * | 12/2021 | Green Mullins | A62B 35/0075 |
| 11,213,713 | B2 * | 1/2022 | Bettini | A63B 21/151 |
| 11,235,185 | B1 * | 2/2022 | Truesdell | A62B 35/0075 |
| 11,390,969 | B1 * | 7/2022 | Aerts | D03D 1/007 |
| 11,478,372 | B2 * | 10/2022 | Sutti | A61H 1/0266 |
| 11,499,604 | B2 * | 11/2022 | Wagner | F16B 45/027 |
| 11,731,745 | B1 * | 8/2023 | Abaygar | B63C 9/20 441/89 |
| 11,872,419 | B1 * | 1/2024 | Morgis | D03D 1/0005 |
| 12,059,585 | B2 * | 8/2024 | Minnick | A62B 35/0081 |
| 12,138,497 | B2 * | 11/2024 | Foreman | A62B 35/0006 |
| 2005/0217748 | A1 * | 10/2005 | Ikegami | D04C 1/12 139/388 |
| 2008/0190691 | A1 * | 8/2008 | Tanaka | A62B 35/04 182/3 |
| 2010/0216613 | A1 * | 8/2010 | Pacini | A63B 21/0552 482/122 |
| 2011/0103558 | A1 * | 5/2011 | Hooten | A62B 35/04 379/37 |
| 2012/0067666 | A1 * | 3/2012 | Smith | A62B 35/04 182/3 |
| 2012/0267403 | A1 * | 10/2012 | Ward, Jr. | A45F 5/00 224/219 |
| 2017/0221339 | A1 * | 8/2017 | Golz | D06P 5/00 |
| 2023/0106104 | A1 * | 4/2023 | Landis | B60D 1/187 280/480 |
| 2023/0347190 | A1 * | 11/2023 | Thurk | A62B 35/0075 |
| 2024/0034607 | A1 * | 2/2024 | Shankar | B66F 11/046 |
| 2024/0307717 | A1 * | 9/2024 | Lingo | A62B 35/04 |
| 2024/0350840 | A1 * | 10/2024 | Squire | A62B 35/04 |
| 2024/0408423 | A1 * | 12/2024 | Truesdell | F16D 63/008 |
| 2024/0416160 | A1 * | 12/2024 | Pouppeville | B65H 54/80 |

* cited by examiner

ENERGY ABSORBING LANYARD

FIELD OF THE INVENTION

The present invention relates generally to safety belts and harnesses, and more particularly, to an energy absorbing lanyard configured to be affixed to a safety belt or harness.

BACKGROUND

Personal fall protection systems include energy absorbing lanyards that are used to protect workers from injury due to falling from elevated locations. Energy absorbing lanyards are designed with an energy absorption section having an energy- or shock-absorbing capacity to limit arrest forces on a user and prevent severe injuries as a result of a fall. In some embodiments, the energy absorption section is formed from an elastic segment covered by a tubular webbing that absorbs energy during a fall. In some embodiments, an external pack includes a length of webbing that is folded and stitched together. During a fall, energy from the fall is absorbed as the stitches are ripped apart.

It is necessary that energy absorbing lanyards used in fall protection systems are resistant to abrasion or being compromised. A means of visually identifying such compromises on the lanyard, such as abrasions, fraying or deterioration, is necessary to facilitate inspection and ensure that the lanyard is safe to be used.

Further, increasing the strength or ability to dissipate or absorb energy in an energy absorbing lanyard is typically accomplished by having a wider, larger webbing but such lanyards may be difficult to work with due to length or bulkiness.

An energy absorbing lanyard that includes solutions to address these shortcomings is needed. The present invention provides a durable, compact, energy absorbing lanyard that includes a means for visually identifying compromises.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

The embodiments described herein relate to a leg of an energy absorbing lanyard, including: a first end couplable to a harness connector; a second end couplable to an anchorage end connector; and an energy absorbing section positioned between the first end and the second end, wherein the energy absorbing section includes a first tubular webbing, a second tubular webbing, and an elastic webbing.

The embodiments described herein relate to an energy absorbing lanyard, including: at least one leg having a first end, a second end, and an energy absorbing portion positioned therebetween; a harness connector coupled to the first end of the at least one leg; and at least one anchorage end connector coupled to each second end of the at least one leg; wherein the energy absorbing section includes, a first tubular webbing, a second tubular webbing, and a third webbing.

The embodiments described herein relate to an energy absorbing lanyard, including: a first end having a first loop coupled to a harness connector; a second end having a second loop coupled to an anchorage end connector; and an energy absorbing section positioned therebetween, wherein the energy absorbing section includes an outer tubular webbing encasing an inner tubular webbing and an elastic webbing, and the inner tubular webbing is of a bright or contrasting color as compared to a color of the outer tubular webbing.

BRIEF DESCRIPTION OF THE DRAWING

Embodiments of the invention are described in detail below with reference to the attached drawing figures, wherein.

Figure 1:
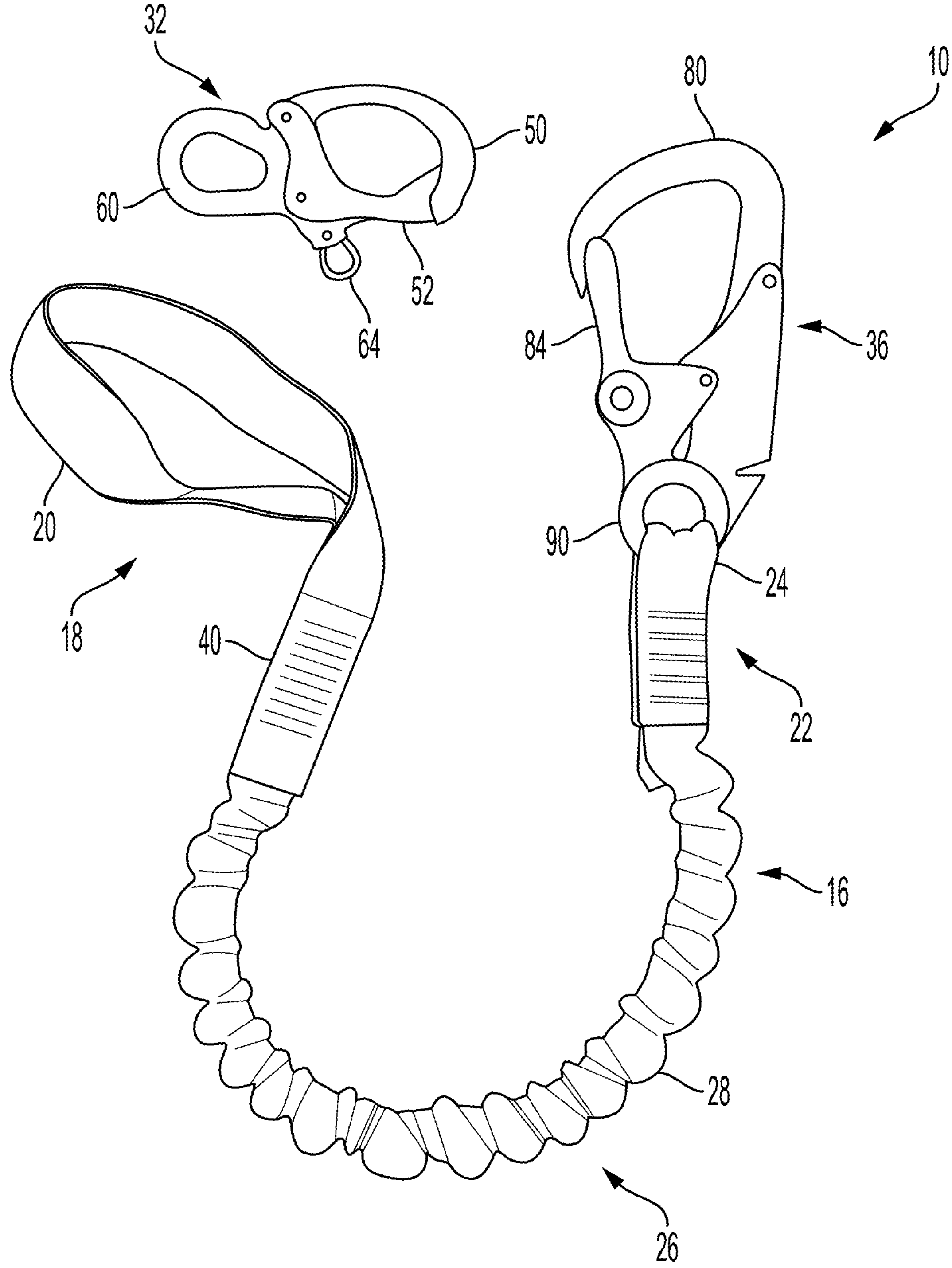
FIG. 1 is a perspective view of an embodiment of an energy absorbing lanyard that includes a gathered, energy absorbing section. In the embodiment shown, a harness connector is uncoupled from the lanyard and an anchorage end connector is coupled to the lanyard.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of the invention is defined only by the appended claims, along with the full scope of the equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Embodiments described herein relate to an energy absorbing lanyard 10 that is used in a personal fall protection system. During use, the lanyard 10 is configured to be secured to an attachment member, such as a D-ring, of a safety belt or safety harness (not shown), and to one or more fixed anchors (not shown) depending on a number of legs 16 coupled to the lanyard 10. Components forming the lanyard 10 may include one or more flat or tubular webbing sections, cables, ropes, connectors, hooks, and other foreseeable components. The components are formed from materials designed to meet or exceed requirements of a minimum breaking strength and/or tensile strength, such as the requirements set forth by OSHA. Examples of materials that may be used include, for example, nylon, polyester, Kevlar, Nomex, etc.

As shown in FIG. 1, the lanyard 10 includes at least one leg 16 having a first end 18 with a first connecting loop 20, a second end 22 with a second connecting loop 24, and a central portion 26 positioned therebetween having at least one energy absorbing section 28. The energy absorbing section 28 provides that the lanyard 10 is in a compact form as compared to its strength and ability to arrest a fall of a user. The first end 18 of the at least one leg 16 is couplable directly to a belt or to a first hook or harness connector 32 that is configured to be secured to the safety belt or harness worn by a user. A second hook or anchorage end connector 36 is coupled to each of the second ends 22 of the at least one leg 16 and is configured to be secured to the anchor or another restraining device.

In the embodiment shown in FIG. 1, the first connecting loop 20 of the first end 18 and the second connecting loop 24 of the second end 22 are formed from a length of tubular webbing that is sewn flat along a longitudinal axis. In an embodiment, the first connecting loop 20 and/or the second connecting loop 24 are formed unitary with or from the same length of tubular webbing as the central portion 26. The first end 18 and/or the second end 22 each may include a terminal end that is folded over onto the length of tubular webbing and secured to form the loop 20 and/or 24, respectively. In an embodiment, the first end 18 and/or the second end 22 may be formed from a separate tubular webbing having two terminal ends, distinct from the length of tubular webbing used to form the central portion 26. In such an embodiment the two terminal ends of the separate tubular webbing are folded such that the two terminal ends are secured to the central portion 26, forming the loop 20 and/or 24, respectively. As shown in FIG. 1, the attachment of the one terminal end of the length of tubular webbing or the attachment of the two terminal ends of the separate tubular webbing to the central portion 26 is reinforced with stitching 40. In an embodiment, the stitching 40 includes a series of bar tacks that extend the width of the tubular webbing and are longitudinally spaced along a portion of the length of the tubular webbing secured to the central portion 26. It is foreseeable that the first end 18 and the second end 22 may be formed from alternate materials or have a different form, such as a strap or a flat braided rope secured to the central portion 26.

The first connecting loop 20 formed on the first end 18 is couplable to the harness connector 32. The harness connector 32 may include a device such as, for example, a snap hook or a carabiner. In the embodiment shown in FIG. 1, the harness connector 32 is uncoupled from the first end 18. The harness connector 32 is a snap hook having a hook 50 and a closure member 52 that is pivotally connected to the harness connector 32 and extends across an opening defined by the hook 50. The closure member 52 is biased closed, that is, in a neutral position the closure member 52 extends across the opening of the harness connector 32 and is engageable with a detent (not shown) that resists pivotable movement of the closure member 52 beyond the hook 50. The closure member 52 is configured to be selectively pivoted out of engagement with the hook 50. In the embodiment shown in FIG. 1, the harness connector 32 is secured to the first end 18 by interconnecting the first connecting loop 20 with an eye 60 formed on the harness connector 32. The first connecting loop 20 is sized to facilitate the interconnection. The harness connector 32 includes a rescue ring 64 configured for securing a secondary securement feature or strap (not shown) thereto that is also secured to the first end 18 of the lanyard 10, such as by knotting the strap to the first end 18. The harness connector 32 may also include a locking mechanism (not shown) for locking the closure member 52 in the closed position.

The second connecting loop 24 formed on the second end 22 is coupled to the anchorage end connector 36. The anchorage end connector 36 may include a device, such as, for example, a rebar hook, a snap hook, or a carabiner. In the embodiment shown in FIG. 1, the anchorage end connector 36 is a rebar hook having a hook 80 and a closure member 84 that is pivotably connected to the anchorage end connector 36 and extends across an opening defined by the hook 80. Similar to the harness connector 32, the closure member 84 is biased closed, that is, in a neutral position the closure member 84 extends across the opening of the anchorage end connector 36 and is engageable with a detent (not shown) that resists pivotable movement of the closure member 84 beyond the hook 80. The closure member 84 is configured to be selectively pivoted out of engagement with the hook 80. In the embodiment shown in FIG. 1, an eye 90 on the anchorage end connector 36 is secured to the second connecting loop 24. The second connecting loop 24 may be smaller than the first connecting loop 20. The anchorage end connector 36 may also include a locking mechanism (not shown) for locking the closure member 84 in the closed position.

In one embodiment, the anchorage end connector 36 is larger in size than the harness connector 32, but the connectors 32 and 36 may be the same size or the harness connector 32 may be larger in size than the anchorage end connector 36. The anchorage end connector 36 should be sized to be compatible with the anchor or other restraining device to which it is configured to be coupled.

Figure 2:
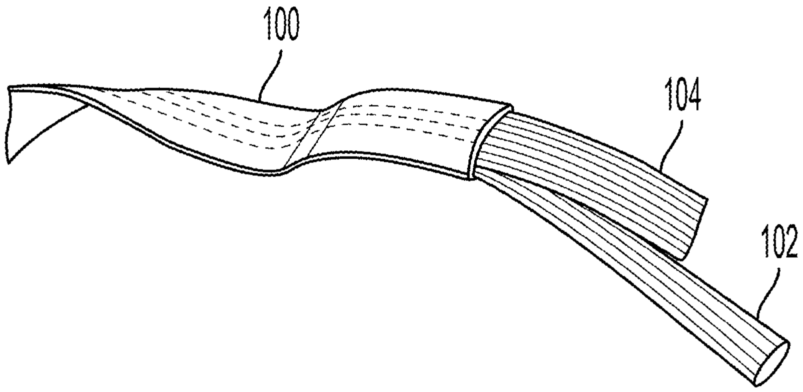
FIG. 2 is a view of an embodiment of the energy absorbing section, including an outer tubular webbing, an inner tubular webbing, and an elastic webbing, used in the energy absorbing lanyard shown in FIG. 1.

The central portion 26 comprises the energy absorbing section 28 shown in FIG. 2. The energy absorbing section 28 includes a plurality of webbings, including a first or outer tubular webbing 100 encasing an integrated energy absorbing core that includes a second or inner tubular webbing 102 and a third or elastic webbing 104. At least the outer tubular webbing 100 and the inner tubular webbing 102 are energy absorbing layers and provide strength to the lanyard 10, limiting a need to significantly increase the bulk of the lanyard 10 by using a wider, larger webbing. The multiple layers of the energy absorbing section 28 are able to better resist being abraded and provide greater energy absorption and strength than single tubular webbings of the prior art. The multiple layers increase abrasion resistance by adding padding and mass at areas likely to be abraded along the energy absorbing section 28, such as, for example, at areas that would be in frictional contact with an edge of a surface or an impact point, making it more difficult for the energy absorbing section 28 to be abraded or cut. In an embodiment the added mass enables the lanyard 10 to move and/or roll on the impact point to avoid repetitive abrasion in an area of the energy absorbing section 28. Further, the lanyard 10 has an increased ability to carry a load and absorb energy due to its greater mass across which energy is dispersed. Specifically, the energy absorbing section 28 is able to absorb energy through each of the outer tubular webbing 100 and the inner tubular webbing 102. The elastic webbing 104 may also provide resistance to compromise, energy absorption, and strength. Still further, a bright and/or contrasting color of the inner tubular webbing 102, such as, for example, red, as compared to the outer tubular webbing 100, provides an indication of a compromised outer tubular webbing 100 by being visible through abraded areas of the outer tubular webbing 100.

In the embodiment shown in FIG. 1, the outer tubular webbing 100 and/or the inner tubular webbing 102 are longer than the elastic webbing 104, which cause gathering of the outer tubular webbing 100 and/or the inner tubular webbing 102 relative to the elastic webbing 104. The outer tubular webbing 100 and/or the inner tubular webbing 102 of the energy absorbing section 28 are gathered along the length of the elastic webbing 104 to control a length of the outer tubular webbing 100 and/or the inner tubular webbing 102 and maintain a compact lanyard 10, such as when the lanyard 10 is worn on a user's waist belt. When the gathered energy absorbing section 28 is loaded or impacted, the elastic webbing 104 stretches such that the energy absorbing section 28 is flattened or to the extent that the elastic webbing 104, the tubular outer webbing 100 and/or the inner tubular webbing 102 are able to stretch.

It is foreseeable that the outer tubular webbing 100 and the inner tubular webbing 102 may be joined to the elastic webbing 104 to form a flat energy absorbing section 28. When the gathered energy absorbing section 28 is loaded or impacted, the elastic webbing 104 stretches to the extent that the elastic webbing 104, the outer tubular webbing 100 and/or the inner tubular webbing 102 are able to stretch.

In an embodiment, the outer tubular webbing 100 is a one-inch tubular webbing casing that contains a ⅝-inch inner tubular webbing 102 and a ⅝-inch elastic webbing 104. In a preferred embodiment, the inner tubular webbing 102 is of a bright or contrasting color as compared to the color of the outer tubular webbing 100, such that the inner tubular webbing 102 can be seen if the outer tubular webbing 100 is compromised, such as, for example, through an abrasion or cut of the outer tubular webbing 100. It is contemplated that the number and variety of webbings that form the energy absorbing section 28 could be modified and such modifications would be within the scope of the embodiments described herein.

In the embodiment shown in FIG. 1, the energy absorbing section 28 of the central portion 26 includes a gathered portion configured to arrest a fall in a controlled manner. The central portion 26 is coupled to the first end 18 and the second end 22, and each end 18 and 22 is configured to be coupled to the harness connector 32 and the anchorage end connector 36, respectively. The energy absorbing section 28 expands elastically in the event of a fall and limits the arresting forces on a user. The energy absorbing section 28 is able to expand and tolerate at least a minimum tensile strength. In an embodiment, the gathered section is able to stretch such that the length of the lanyard 10 extends from approximately 2½ feet in a retracted state to approximately 3½ feet in a stretched state. It is foreseeable that the energy absorbing section 28 could stretch to a greater extent or to lesser extent relative to the original length depending on factors, such as, for example, elastic properties of the energy absorbing section 28 and an initial length of the energy absorbing section 28.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned-improvements without departing from the scope of the present disclosure. It will be understood that certain features and sub-combinations are of utility and may be employed without reference to other features and sub-combinations and are contemplated within the scope of the claims.

Having thus described the invention, what is claimed as new and desired to be secured by Letters Patent is:

1. A leg of an energy absorbing lanyard, comprising:
- a first end couplable to a harness connector;
- a second end couplable to an anchorage end connector; and
- an energy absorbing section positioned between the first end and the second end, wherein the energy absorbing section comprises a plurality of tubular webbings, and the plurality of tubular webbings include a first tubular webbing encasing a second tubular webbing, and the energy absorbing section further comprises an elastic webbing.

2. The leg of the energy absorbing lanyard of claim 1, wherein the first end includes a first loop.

3. The leg of the energy absorbing lanyard of claim 1, wherein the second end includes a second loop.

4. The leg of the energy absorbing lanyard of claim 1, wherein the first tubular webbing encases the elastic webbing.

5. The leg of the energy absorbing lanyard of claim 1, wherein the second tubular webbing is of a contrasting color as compared to a color of the first tubular webbing, and the second tubular webbing is visible through abraded or cut areas of the first tubular webbing to provide an indication of a compromise in the first tubular webbing.

6. The leg of the energy absorbing lanyard of claim 1, wherein the energy absorbing section includes at least one of the plurality of tubular webbings gathered relative to the elastic webbing.

7. An energy absorbing lanyard, comprising:
- at least one leg having a first end, a second end, and an energy absorbing section positioned therebetween;
- a harness connector coupled to the first end of the at least one leg; and
- an anchorage end connector coupled to each second end of the at least one leg; wherein:
- the energy absorbing section comprises a first tubular webbing encasing a second tubular webbing, and the energy absorbing section further comprises an elastic webbing.

8. The energy absorbing lanyard of claim 7, wherein the first end comprises a first loop coupled to the harness connector.

9. The energy absorbing lanyard of claim 7, wherein the second end comprises a second loop coupled to the anchorage end connector.

10. The energy absorbing lanyard of claim 7, wherein the first tubular webbing encases a third webbing.

11. The energy absorbing lanyard of claim 7, wherein the second tubular webbing is of a contrasting color as compared to a color of the first tubular webbing, and the second tubular webbing is visible through abraded or cut areas of the first tubular webbing to provide an indication of a compromise in the first tubular webbing.

12. The energy absorbing lanyard of claim 7, wherein the second tubular webbing is of a bright or contrasting color as compared to a color of the first tubular webbing.

13. The energy absorbing lanyard of claim 7, wherein at least one of the first tubular webbing and the second tubular webbing is gathered relative to the elastic webbing.

14. An energy absorbing lanyard, comprising:

a first end having a first loop coupled to a harness connector;

a second end having a second loop coupled to an anchorage end connector; and an energy absorbing section positioned therebetween, wherein the energy absorbing section comprises an outer tubular webbing encasing an inner tubular webbing and an elastic webbing, and the inner tubular webbing is of a bright or contrasting color as compared to a color of the outer tubular webbing.

15. The energy absorbing lanyard of claim 14, wherein at least one of the outer tubular webbing and the inner tubular webbing are gathered relative to the elastic webbing to form a gathered portion.

16. The energy absorbing lanyard of claim 14, wherein the inner tubular webbing is visible through abraded or cut areas of the outer tubular webbing to provide an indication of a compromise in the outer tubular webbing.

* * * * *